Patented Mar. 1, 1927.

1,619,785

UNITED STATES PATENT OFFICE.

JAMES BEVERIDGE, OF RICHMOND, VIRGINIA.

LINING MATERIAL FOR ALKALI-RECOVERY FURNACES.

No Drawing. Application filed November 7, 1925. Serial No. 67,674.

Hithereto, soapstone, cut into solid blocks, has been used for building and lining high-temperature furnaces, more especially those technically known as "smelters" used for the recovery of the soda in the manufacture of wood pulp in paper and pulp factories. These solid soapstone blocks are specially cut to size and are therefore expensive. I have found that many advantages are obtained in the construction of such furnaces by using a soapstone concrete instead of blocks, the concrete being composed of soapstone broken into small pieces and Portland cement. These ingredients are thoroughly mixed together, water added, and the wet concrete mixture poured or rammed into moulds or forms as desired. Furthermore, I find it advantageous to add to the concrete mixture a small quantity of silicate of soda ("water glass") which assists in binding the materials together. Such a mixture, when allowed to set and dry out, very effectually withstands high temperatures and also the action of the molten soda salts.

In order to carry out my invention in practice, I construct an outer casing or shell for the furnace of steel plate or bricks of the desired size and shape, which may be circular, square or rectangular, and, after building the usual wooden concrete-retaining forms within the said outer casing or shell, in size and position in accordance with the desired thickness of concrete, the soapstone, broken to walnut size and under, and cement are mixed together in the proportion of 75 to 85 parts of soapstone and 25 to 15 parts of cement. After the addition of water, to which I add from 2 to 5 per cent of the weight of the dry concrete mixture of liquid silicate of soda of 1.700 specific gravity, and after thorough mixing, the wet concrete is poured or rammed into place in the form or mould and allowed to "set" for a few days. Finally the furnace, when completed, is dried out with a slow fire and is then ready for use. The flues leading from these furnaces to the rotary roaster or steam boiler can also be constructed of or lined with the same concrete mixture, but I find it advantageous to reinforce such flues with steel rods.

Instead of moulding the lining in situ, as above set forth, soapstone-concrete of the above composition can be cast into blocks of any desired size and shape, and these blocks used for the construction of or lining of said "smelter" furnaces and the flues attached.

By "Portland cement" in the following claims I intend to include hydraulic cement containing lime, silica and alumina variously made from chalk, limestone, marl, clay, slate, river mud and blast furnace slag used in such mixtures as to contain lime, alumina and silica in the right proportions, said mixtures being burned to incipient vitrification and ground; or the finely pulverized hydraulic product resulting from the calcination or clinkering of an intimate mixture of properly proportioned argillaceous and calcareous material. It is to be understood also I intend to include under the term "Portland cement" all those materials which under the patent laws are the equivalent of Portland cement in the relationship in which this latter cement is herein used.

What I claim as new is:

1. A lining material for alkali recovery furnaces consisting essentially of a concrete formed of non-pulverulent masses of soapstone and Portland cement.

2. A lining material for alkali recovery furnaces consisting essentially of a concrete of soapstone in broken pieces and Portland cement, the proportion of soapstone exceeding the proportion of cement.

3. A lining material for alkali recovery furnaces consisting essentially of masses of soapstone of gravel-like sizes in the proportion of 75 to 85 parts of soapstone to 25 to 15 parts of Portland cement.

4. A lining material for alkali recovery furnaces consisting essentially of a concrete of non-pulverulent pieces of soapstone, Portland cement and a small quantity of sodium silicate.

In testimony whereof I hereunto affix my signature.

JAMES BEVERIDGE.